United States Patent [19]

Leibfried

[11] Patent Number: 5,124,375
[45] Date of Patent: * Jun. 23, 1992

[54] PROCESS FOR PREPARING ORGANOSILICON PREPOLYMERS AND POLYMERS

[75] Inventor: Raymond T. Leibfried, Wilmington, Del.

[73] Assignee: Hercules Incorporated, Wilmington, Del.

[*] Notice: The portion of the term of this patent subsequent to Feb. 20, 2007 has been disclaimed.

[21] Appl. No.: 461,558

[22] Filed: Jan. 5, 1990

Related U.S. Application Data

[60] Division of Ser. No. 232,826, Aug. 16, 1988, Pat. No. 4,902,731, which is a continuation-in-part of Ser. No. 79,740, Jul. 30, 1987, Pat. No. 4,900,779, which is a continuation-in-part of Ser. No. 901,092, Aug. 27, 1986, abandoned.

[30] Foreign Application Priority Data

Aug. 25, 1987 [CA] Canada .................................. 545252

[51] Int. Cl.$^5$ ...................... C08L 83/05; C08G 77/04
[52] U.S. Cl. .................................. 523/222; 524/862; 525/479; 528/15; 528/25; 528/31
[58] Field of Search ............................ 528/15, 25, 31; 525/479; 524/862; 523/222

[56] References Cited

U.S. PATENT DOCUMENTS 4,902,731 2/1990 Leibfried .............................. 523/222

OTHER PUBLICATIONS

Toshimi Okada et al., "Asymmetric Hydrosilation of Cyclopentadiene and Styrene with Chlorosilanes Catalysed by Palladium Complexes of Chiral (β-N-Sulfonylaminoalkyl) phosphines)" *Chemistry Letters*, pp. 999-1002.
V. Vaisarova' et al., "Palladium- and Nickel-Catalyzed Hydrosilylation of Cyclopentadiene", *Collection Czechoslov. Chem. Comm.* vol. 41, pp. 1906-1913 (1976).
Kohei Tamao, "Organofluorosilicates in Organic Synthesis. 12. Preparation of Organopentafluorosilicates and Their Cleavage Reactions by Halogens and N--Bromosuccinimide. Synthetic and Mechanistic Aspects", *Organometallics* 1, pp. 355-368 (1982).
Tamio Hayashi et al., "Optically Active Cyclic Allylsilanes Preparation by Asymmetric Hydrosilylation and Anti Stereochemistry in S$_E$' Reactions", *Tetrahedron Letters*, vol. 14, No. 50, pp. 5661-5664 (Pergamon Press 1983).
Keiji Yamamoto et al., "Catalytic Asymmetric Hydrosilylation of Olefins III. Chiral Phospine-Palladium-(II) Complexes as Hydrosilylation Catalysts", *Journal of Organometallic Chemistry*, 210 pp. 9-17 (1981).
Iwao Ojima et al. "3-TMS-Cyclopentene-1, A New Reagent for the Synthesis of Cyclopentene Derivatives", *Tetrahedron Letters* No. 16, pp. 1385-1388 (Pergamon Press 1977).
Yoshihisa Kiso et al., "Asymmetric Homogeneous Hydrosilation with Chiral Phosphine-Palladium Complexes", *Journal of the American Chemical Society* 94:12 pp. 4373-4374 (Jun. 14, 1972).

Primary Examiner—John C. Bleutge
Assistant Examiner—R. Dean, Jr.
Attorney, Agent, or Firm—Mark D. Kuller; William S. Alexander

[57] ABSTRACT

A novel organosilicon prepolymer, which is the partial reaction product of (a) a cyclic polysiloxane or a tetrahedral siloxysilane containing at least two hydrosilane groups and (b) a polycyclic polyene having in its rings at least two chemically distinguishable carbon-carbon double bonds, wherein the ratio of carbon-carbon double bonds in the rings of (b) to hydrosilane groups in (a) is greater than 0.5:1 and up to 1.8:1, and at least one of the compounds (a) and (b) has more than two reactive sites, a method for making the organosilicon prepolymer, and a method for preparing an organosilicon polymer therefrom, are disclosed.

21 Claims, No Drawings

PROCESS FOR PREPARING ORGANOSILICON PREPOLYMERS AND POLYMERS

This is a divisional of U.S. patent application Ser. No. 07/232,826, filed Aug. 16, 1988, now U.S. Pat. No. 4,902,731, which is a continuation-in-part of U.S. patent application Ser. No. 07/079,740, filed Jul. 30, 1987 now U.S. Pat. No. 4,900,779, which is a continuation-in-part of U.S. Pat. No. 06/901,092, filed Aug. 27, 1986, now abandoned.

This invention relates to a new and novel class of organosilicon polymer intermediates and the process of making thermoset and thermoplastic polymers using the same.

BACKGROUND OF THE INVENTION

A new class of high molecular weight organosilicon polymers which have excellent physical, thermal and electrical properties and outstanding resistance to water, and that can be used to prepare shaped articles is described in parent application Ser. Nos. 07/079,740 and 06/901,092. They are thermoset or thermoplastic organosilicon polymers comprising alternating polycyclic hydrocarbon residues and cyclic polysiloxanes or siloxysilane residues linked through carbon to silicon bonds.

Preferred organosilicon polymers are the reaction product of (a) a cyclic polysiloxane or a tetrahedral siloxysilane containing at least two hydrosilane groups and (b) a polycyclic polyene, wherein the ratio of carbon-carbon double bonds in the rings of (b) to hydrosilane groups in (a) is greater than 0.5:1 and up to 1.8:1 and at least one of the compounds (a) and (b) has more than two reactive sites.

U.S. patent application Ser. No. 07/079,740 also describes a method of preparing the organosilicon polymers according to the invention which is characterized in that it comprises reacting, in the presence of a platinum-containing catalyst, (a) a cyclic or tetrahedral polysiloxane containing at least two hydrosilane groups and (b) a polycyclic polyene, the ratio of carbon-carbon double bonds in (b) to hydrosilane groups in the rings of (a) being greater than 0.5:1 and up to 1.8:1 and at least one of the compounds (a) and (b) having more than two reactive sites, and subjecting said polymer to heat to drive the cross-linking to a maximum.

SUMMARY OF THE INVENTION

This invention is directed to heat-curable prepolymers or oligomers (hereafter "prepolymer") which are the partial reaction product of (a) a cyclic polysiloxane or a tetrahedral siloxysilane containing at least two hydrosilane groups and (b) a polycyclic polyene having at least two chemically distinguishable carbon-carbon double bonds, wherein the ratio of carbon-carbon double bonds in the rings of (b) to hydrosilane groups in (a) is greater than 0.5:1 and up to 1.8:1 and at least one of the compounds (a) and (b) has more than two reactive sites; a process for forming the prepolymers; and a process of forming organosilicon polymers wherein the prepolymer is formed and later cured to form the organosilicon polymer.

DETAILED DESCRIPTION OF THE INVENTION

Any cyclic polysiloxane or tetrahedral siloxysilane with two or more hydrogen atoms bound to silicon will enter into the reaction. Cyclic polysiloxanes useful in forming the products of this invention have the general formula:

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

The tetrahedral siloxysilanes are represented by the general structural formula

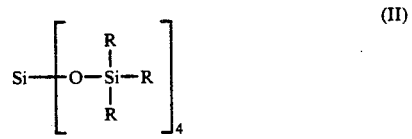

wherein R is as defined above and is hydrogen on at least two of the silicon atoms in the molecule.

Examples of reactants of Formula (I) include, e.g., tetramethyl cyclotetrasiloxane, pentamethyl cyclopentasiloxane, hexamethyl cyclohexasiloxane, tetraethyl cyclotetrasiloxane, cyclotetrasiloxane, tetraphenyl cyclotetrasiloxane, tetraoctyl cyclotetrasiloxane and hexamethyl tetracyclosiloxane.

The most commonly occurring members of this group are the tetra-, penta-, and hexacyclosiloxanes, with tetramethyl tetracyclosiloxane being a preferred member. In most cases, however, the material is a mixture of a number of species wherein n can vary widely. Generally, commercial mixtures contain up to about 20% (in purer forms as low as 2%) low molecular weight linear methylhydrosiloxanes, such as heptamethyltrisiloxane, octamethyltrisiloxane, etc.

Examples of reactants of Formula (II) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Polycyclic polyenes which can be employed are polycyclic hydrocarbon compounds having at least two non-aromatic carbon-carbon double bonds, which have different chemical reactivities, in their rings. By "chemically distinguishable carbon-carbon double bonds" it is meant that at least two carbon-carbon double bonds have different chemical reactivities, i.e., different degrees of reactivity to the silanes and, thus, most of one type of bond will react prior to substantial reaction of the second type. Illustrative are compounds selected from the group consisting of dicyclopentadiene, tricyclopentadiene, and methyl dicyclopentadiene, and substituted derivatives of any of these. Preferred is dicyclopentadiene.

Two or more polycyclic polyenes can be used in combination. Typically, comonomers will be present in an amount up to 30%, based on the weight of the polymer formulation.

The reactions for forming the prepolymer and for forming a polymer from the prepolymer can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum.

The reactions for forming the prepolymer and organosilicon polymer proceed readily in the presence of a platinum-containing catalyst. The preferred catalyst, in terms of both reactivity and cost, is chloroplatinic acid ($H_2PtCl_6.6H_2O$). Catalyst concentrations of 0.0005 to about 0.05% by weight, based on weight of the monomers, will effect smooth and substantially complete polymerization. Other platinum compounds can also be used to advantage in some instances, such as $PtCl_2$ and dibenzonitrile platinum dichloride. Platinum on carbon is also effective for carrying out high temperature polymerizations. Other useful platinum catalysts are disclosed in, e.g., U.S. Pat. Nos. 3,220,972, 3,715,334 and 3,159,662. An exhaustive discussion of the catalysis of hydrosilation can be found in Advances in Organometallic Chemistry, Vol. 17, beginning on page 407.

It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

If thermoset polymers are desired, the ratio of carbon-carbon double bonds of (b) to hydrosilane groups in (a) is in the range of from about 0.7:1 up to about 1.3:1, more preferably from about 0.8:1 up to about 1.1:1. The alternating residues form a cross-linked thermoset structure.

If thermoplastic polymers are desired, the ratio of carbon-carbon double bonds in the rings of (b) to hydrosilane groups in (a) is (i) greater than 0.5:1 and up to about 0.7:1 or (ii) in the range of from about 1.3:1 up to 1.8:1.

To prepare the thermoset and thermoplastic polymers, several approaches are available. In one approach described in U.S. patent application Ser. No. 07/079,740, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon bonds to hydrosilane groups of about 1:1, where 70 to 80% of the hydrosilane groups are consumed).

The initial product of the reaction at lower temperatures, e.g., about 50° to about 80° C. is often a prepolymer, which may be in the form of a solid or a flowable, heat-curable liquid, even though the ratio of carbon-carbon double bonds to hydrosilane groups is otherwise suitable for cross-linking. Such prepolymers, analogous to the so-called B-stage resins encountered in other thermoset preparations, can be recovered and subsequently transferred to a mold for curing.

The prepolymers, including the viscous, flowable liquid prepolymers, are stable at room temperature for varying periods of time, but, upon reheating to an appropriate temperature, e.g., about 100° to about 250° C., they cure to the same types of thermoset polymers as are prepared when polymerization is carried out substantially immediately.

The B-stage type prepolymers can be prepared by cooling the reaction mass, following the initial exotherm, to about 30° to 65° C. and maintaining it at that point for several hours, and then interrupting the reaction by removing the heat until such time as it is desired to complete the transition to a glassy, cross-linked thermoset polymer. The prepolymers generally have 30 to 65% of the hydrosilane groups reacted, and when liquids are desired preferably about 30 to 50% of the hydrosilane groups reacted. By monitoring the viscosity build-up, the practitioner can select, for his own purposes, the point at which the polymerization is to be interrupted.

The basic reaction is fast. However, it is exothermic, and without using heat removal equipment the formation of the prepolymers is generally carried out over two to twenty-four hours. In a continuous process with adequate heat removal the reaction can be carried out quickly.

The thermoplastic polymers can normally be ground and shipped to a molder where they will be heated and formed into a shaped article. Thus, while prepolymers can be formed as described above, they are primarily used when thermoset products are desired.

Although a hydrosilation reaction via the carbon-carbon unsaturation of the polycyclic polyene rings and the hydrosilane group is the primary polymerization and cross-linking mechanism, other types of polymerization and cross-linking may also take place as the curing temperature is increased. These may include, e.g., oxidative cross-linking, free radical polymerization (olefin addition reactions) and condensation of silanols to form siloxane bonds.

The thermoset polymers have a range of utilities, depending upon their physical form. Tacky solids are useful as tackifiers in pressure sensitive adhesives and as contact adhesives. They are also useful as structural adhesives, curable in situ, to form strong bonds due to a high affinity of hydrosilane derived silanol groups for polar metal surfaces, especially oxidized metal surfaces. The elastomeric embodiments make excellent potting compounds for electronic applications since they can be cured in situ and are insensitive to water.

Thermal properties of the thermoset polymers are also outstanding. The glass transition temperature (Tg) of a fully cured thermoset polymer is about 200° C. or higher. Thermal stability is excellent with usually less than 10% weight loss at 500° C. during thermogravimetric analysis. At 1100° C. in air, they leave about 50% residue. The thermoset polymers are fire resistant and burn very slowly when subjected to a flame.

A particularly striking property of these thermoset polymers is their virtually total insensitivity to water. They have been found to be unaffected by boiling water after extended periods.

The thermoset polymers are also resistant to oxidation and to ultraviolet radiation at ordinary temperatures. Above 200° C., oxidative cross-linking of silicon portions of the molecule appears to take place, resulting in the formation of a dark siliceous outer layer. This oxidized outer layer appears to impede the oxidative degradation of the polymer.

The thermoset polymers pyrolyze upon heating to greater than 1000° C. to form a high yield (40–50%) of a ceramic. This high temperature resistance makes them useful as refractory materials, fire resistant materials and ablative materials.

The thermoplastic polymers generally exhibit melting points in the range of from about 60° C. to about 130° C. However, when post-cured at temperatures greater than 200° C., some (for instance, those having a ratio of carbon-carbon double bonds to hydrosilane groups of 1.45:1.0) exhibit elastomeric characteristics, and, in some instances, they have higher softening points or exhibit thermoset properties after post-cure.

The thermoplastic polymers range from tacky to hard, non-tacky solids which have low melting points. Some of the polymers (e.g., those having a ratio of carbon-carbon double bonds to hydrosilane groups of 1.45:1.0.) exhibit thermoplastic behavior (melt flow) until they are heated to a higher temperature (200° to 300° C.) where they become thermoset polymers. These can be considered thermoplastic-thermoset polymers. These materials can be coated on substrates as powders, melts, or solutions and cured to give glass transitions somewhat lower than the polymers that have mainly thermoset behavior (e.g., those having a ratio of carbon-carbon double bonds to hydrosilane groups of about 0.7:1 to about 1.3:1).

A number of options exist for incorporating additives into the polymer. Additives such as fillers and pigments are readily incorporated. Carbon black, vermiculite, mica, wollastonite, calcium carbonate, sand, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 80%. Stabilizers and antioxidants are useful to maintain storage stability of B stage materials and thermal oxidative stability of the final product.

Glass or carbon, e.g., graphite, fibers are wetted very well by the liquid prepolymers making them excellent matrix materials for high strength composite structures. Thus a mold containing the requisite staple or continuous filament can be charged with the prepolymer and the prepolymer cured to form the desired composite structure. Fiber in fabric form can also be employed. In addition, solid thermoplastic polymers may be melted, poured over such fibers, and heated to form composites or thermoplastic polymer powders may be blended with such fibers and, then, heated to form a composite. Fiber reinforced composites of the polymers of this invention can contain as much as 80%, preferably 30 to 60%, by weight, of fibrous reinforcement, and, when fully cured, typically exhibit extremely high tensile and flexural properties and also excellent impact strength. Other types of fibers, e.g., metallic, ceramic and synthetic polymer fibers, also work well.

The glass filled, thermoset products which have been polymerized to the tough glassy state are characterized by high physical properties, i.e., high modulus and high tensile strength and good flex properties. They are fire resistant, burn very slowly when subjected to a flame, and self-extinguish when the flame is removed.

The following examples are presented to demonstrate this invention. They are not intended to be limiting. Therein, all percentages, parts, etc., are by weight, unless otherwise indicated.

EXAMPLE 1

This example shows preparation of a molded, glass cloth reinforced, article comprising a thermoset polymer by preparing a B stage prepolymer by partially reacting dicyclopentadiene and tetramethylcyclotetrasiloxane (ratio of carbon-carbon double bonds to hydrosilane groups of 1:1), injecting the B stage prepolymer into a mold, and heating to complete polymerization.

Chloroplatinic acid (0.0101 g) was charged to a dry 750 ml reaction vessel in a $N_2$ filled glove bag and the reaction vessel was sealed. Dry dicyclopentadiene (26.44 g, 0.2 mole) was charged by syringe. This mixture was heated at 55° C. for one hour to form a dicyclopentadiene/chloroplatinic acid catalyst complex. Dry tetramethylcyclotetrasiloxane (24.05 g, 0.10 mole) was added gradually at 56° C. and an immediate exotherm took the temperature to 174° C. The mixture was cooled to 64° to 65° C. and held there for 1.5 hour. $Si^{29}NMR$ shows that the hydrosilation reaction is about 50% complete at this time. The low viscosity product was removed from the reaction vessel by syringe and injected into a teflon coated mold containing glass cloth which exactly filled the mold cavity. The resin in the mold was degassed at 60° C. under a slight vacuum in a vacuum oven The aspirator vacuum was manually controlled to keep the resin from foaming out of the mold. The mold was heated in an oven at 68° C. for 18 hours and then at 140° to 150° C. for 3 days. The oven was cooled slowly and the mold unclamped to give a very hard, stiff 5"×5"×⅛" plaque. Samples were cut for rheological, tensile, and flexural property determinations and the following data were obtained:

| 60% Glass Cloth, 40% Tetramethylcyclotetrasiloxane/ Dicyclopentadiene ⅛ | |
|---|---|
| Tensile Strength | 23,800 psi |
| Tensile Modulus | $1.2 \times 10^6$ psi |
| % Elongation (break) | 2.2 |
| Flexural Strength | 40,400 psi |
| Flexural Modulus | $2.2 \times 10^6$ psi |
| Rockwell R Hardness | 119 |
| Glass Transition Temp (Rheometrics) | 160° C. |
| Notched Izod Impact. | 10 ft lb/in notch |
| Heat Distortion Temperature (264 psi) | 300° C. |

EXAMPLE 2

This example shows preparation of a thermoset polymer by reacting dicyclopentadiene and tetramethylcyclotetrasiloxane with a ratio of carbon-carbon double bonds to hydrosilane groups of approximately 1:1.

A dry, $N_2$ sparged vessel was charged with a stir bar and chloroplatinic acid (0.0021 g). The vessel was capped and charged with dicyclopentadiene (20.12 g, 0.152, mole). The resulting mixture was stirred for thirty minutes at 60° C. Tetramethylcyclotetrasiloxane (18.1 g, 0.075 mole) was added and thirty seconds later the reaction mixture exothermed to 186° C. The reaction mixture was stirred for 16 hours, 250° C. for 2 hours and 280° C. for 16 hours to give a brown, glassy solid. The reaction mixture was stirred for 16 hours at 60° C., 24 hours at 70° C. and 5 hours at 150° C. The mixture was poured into an aluminum pan and cured for 12 hours at 200° C., 2 hours at 225° C., 2 hours at 250° C. and 16 hours at 280° C. to give a brown glassy solid.

The thermal stability of the polymer of Example 3 is presented in the following table.

| | TGA (20° C./Min.) | |
|---|---|---|
| Example No. | 10% Wt. Loss (°C.) | % Residue (1100 °C.) |
| 2 | 510 | 39 |

EXAMPLE 3

This example show preparation of a molded, thermoset polymer by reacting dicyclopentadiene and methylcyclotetramethylsiloxane, with a ratio of carbon-carbon double bonds to hydrosilane groups of approximately 1:1.

Following the general procedure in Example 2, tetramethylcyclotetrasiloxane (49.76 g, 0.20 mole) was added to a heated (70° C.) mixture of dicyclopentadiene (54.71 g, 0.414 mole) and chloroplatinic acid (0.0209 g). Thirty seconds after the tetramethylcyclotetrasiloxane addition, the reaction mixture exothermed to 170° C. The reaction mixture was stirred for 16 hours at 130° C. and poured into a teflon coated mold. The sample was cured for 16 hours at 150° C. to give an opaque, glassy solid.

EXAMPLE 4

This example show preparation of a molded, glass cloth reinforced, article comprising a thermoset polymer. A B stage prepolymer was prepared by partially reacting dicyclopentadiene and tetramethyl cyclotetrasiloxane in amounts such that the ratio of carbon-carbon double bonds to hydrosilane groups was 1.1:1. Then, the B stage prepolymer was poured into a mold containing a glass cloth and was heated to complete polymerization.

Following the general procedure in Example 2, tetramethylcyclotetrasiloxane (28.6 g, 0.12 mole) was added to a heated (55° C.) mixture of dicyclopentadiene (34.4 g, 0.26 mole) and chloroplatinic acid (0.0126 g). Thirty seconds after the tetramethyl cyclotetrasiloxane addition, the reaction mixture exothermed to 184° C. The reaction mixture was stirred for 2 hours at 80° C. then transferred to a teflon-coated mold containing 50.9 g woven glass cloth. The sample was cured for 12 hours at 130° C., for eight hours at 160° C., and for 16 hours at 180° C. to give an opaque, glassy plaque containing 60.7 wt. % glass cloth. This plaque was further cured in a $N_2$ flushed oven at 200° C., 250° C. and 310° C. for 4 hours at each temperature.

EXAMPLE 5

This example shows preparation of a molded, opaque solid plaques comprising a thermoset polymer, by preparing a B stage prepolymer by partially reacting dicyclopentadiene and tetramethyl cyclotetrasiloxane (ratio of carbon-carbon double bonds to hydrosilane groups of 1:1), transferring the B stage prepolymer into a mold, and heating to complete polymerization.

Following the general procedure in Example 2, tetramethylcyclotetrasiloxane (76.36 g, 0.32 mole) was added to a heated (30° C.) mixture of dicyclopentadiene (83.9 g, 0.64 mole) and chloroplatinic acid (0.0148 g). Five minutes after this addition the reaction mixture exothermed to 193° C. The reaction mixture was stirred for 1 hour at 55° to 70° C., transferred to teflon-coated molds and cured at 145° C. for 18 hours under slight vacuum. The opaque solid plaques were further cured to 285° C. in a $N_2$ flushed oven.

The polymers of Examples 5 and 6 were further subjected to mechanical analysis to determine their glass transition temperature (Tg) and storage modulus (G') at various temperatures. Results are recorded in the following table.

| | Mechanical Analysis | | | | | | |
|---|---|---|---|---|---|---|---|
| | Wt. % | Tg | G' (GPa) at T (°C.) | | | | |
| Example(1) | Glass | (°C.) | 25 | 100 | 140 | 180 | 200 |
| 4(a) | 60.7 | 275 | 2.7 | 2.2 | 2.0 | 1.8 | 1.6 |
| (b) | 60.7 | 300 | 2.5 | 2.1 | 1.8 | 1.5 | 1.4 |
| 5(a) | 0 | 245 | 0.8 | 0.57 | 0.50 | 0.43 | 0.35 |
| (b) | 0 | 250 | 0.78 | 0.60 | 0.50 | 0.40 | 0.35 |

(1) (a)Denotes data before water boil. (b)Denotes data after 5 day water boil.

The data in this table demonstrate the relative water insensitivity of the organosilicon polymers of this invention. The weight gained after 5 days in boiling water was about 0.1%.

EXAMPLE 6

This example shows preparation of a thermoset polymer by reacting a dicyclopentadiene oligomer comprising about 58.43% dicyclopentadiene, 43.75% tricyclopentadiene and 5.05% tetracyclopentadiene (analyzed by G,C.), and tetramethylcyclotetrasiloxane (ratio of carbon-carbon double bonds to hydrosilane groups of 0.86:1).

A complex of 0.0076 g of chloroplatinic acid and 21.71 g (0.12 mole) of the dicyclopentadiene oligomer was prepared by heating the two materials under a dry nitrogen blanket for one hour at 50° C. Tetramethylcyclotetrasiloxane (16.10 g, 0.07 mole) was added to the yellow complex (complex temperature was 71° C.). The reaction exothermed to 153° C. in 8 seconds. The yellow solution was cooled to 30° C., poured into Teflon coated slotted molds and cured at 150° C./16 hours and 200° C./4 hours. The ½"×3"×⅛" test pieces were removed from the mold and post cured at 100° C./0.5 hours, 150° C./0.5 hours, 200° C./2 hours, 225° C./2 hours, 250° C./2 hours and 280° /16 hours.

The final polymer was a hard glassy solid with a glass transition temperature of 250° C. and the weight loss by thermogravimetric analysis started at 500° C.

EXAMPLE 7

This example shows the preparation of a molded article comprising a thermoset polymer, by partially reacting dicyclopentadiene and tetramethylcyclotetrasiloxane (ratio of carbon-carbon double bonds to hydrosilane groups of 1:1) to form a B stage type prepolymer, injecting the B stage prepolymer into a mold, and heating to complete polymerization.

The catalyst, chloroplatinic acid (0.0148 g) was charged to a dried 25 oz. reaction vessel and sealed. Under a nitrogen blanket 83.95 g (0.635 mole) dicyclopentadiene was charged by syringe. The catalyst and dicyclopentadiene were heated for 90 minutes at 60° to 70° C. giving a yellow solution which was cooled to 30° C. Tetramethylcyclotetrasiloxane (76.36 g, 0.317 mole) was added and an exothermic reaction started in two minutes, eventually reaching 193° C. After cooling to 55° C., a sample was injected into a 5"×5"×⅛" teflon lined aluminum mold. The polymer was polymerized at temperatures ranging from 120° to 280° C. under a blanket of nitrogen. Some electrical properties of the cured polymer are given below:

| Dielectric Constant | 2.87 | 60 Hz |
|---|---|---|
| | 2.83 | 1 MHz |
| Dissipation | 0.0001 | 60 Hz |
| Factor | 0.0002 | 100 KHz |

| | |
|---|---|
| Volume Resistivity ohm-cm | $1.6 \times 10^{18}$ |
| Dielectric Strength v/mil | 381 |

A sample of the Example 7 polymer was immersed in boiling water for five days. The sample weight increased 0.1%. The dimensions of the sample (6.75, 1.30 cm, 0.32 cm) were unchanged after the boiling water treatment. The modulus/temperature curve and glass transition temperature (250° C.) were also unchanged by the boiling water treatment.

EXAMPLE 8

This example shows preparation of a thermoset polymer by reacting dicyclopentadiene and a mixture of methylhydrocyclosiloxanes, with a ratio of carbon-carbon double bonds to hydrosilane groups of 0.7:1.

Chloroplatinic acid (0.0035 g) was weighed into an 8 oz. reaction vessel under a nitrogen blanket in a dry box and the septum was sealed. Dry dicyclopentadiene (8.08 g) was injected into the reaction vessel by a hypodermic syringe. The contents of the reaction vessel were heated to 60° to 65° C. for 1 hour, under a nitrogen blanket, and the chloroplatinic acid dissolved. Dry air was swept through the reaction vessel for 10 to 15 minutes and the contents were cooled to 31° C. Methylhydrocyclosiloxanes, consisting of 54% tetramethyl cyclotetrasiloxane, 20% pentamethyl cyclopentasiloxane, 5% hexamethyl cyclohexasiloxane, 19% higher methylhydrocyclosiloxanes (up to approximately $((CH_3(H)SiO-)_{20})$, and 2% linear methylhydrosiloxanes, (total 11.93 g) were injected and the reaction exothermed to 179° C. After cooling the reaction product to 60° C., it was poured into a teflon coated stainless steel mold. The mold was placed into a vacuum oven and a vacuum applied (approximately 15 mm Hg pressure, vacuum pump) for 10 to 15 minutes. Then, the mold was heated under nitrogen for 6 hours at 180° C., for 6 hours at 225° C., for 2 hours at 235° C., and for 4 hours at 285° C.

The polymer of this example exhibits thermoset behavior when polymerized at 225° C. The polymer does not have a melting point, but softens at 100° C. to a soft extendable elastomer. The polymer is a tough, leather like solid at room temperature. It is flexible enough to be twisted 360° before tearing.

EXAMPLE 9

This example shows preparation of a thermoset polymer by reacting dicyclopentadiene and methylhydrocyclosiloxanes in the same manner as in example 8, except that the monomers were used in amounts such that the ratio of carbon-carbon ratio of carbon-carbon double bonds to hydrosilane groups was 0.85:1 and the final heating was for 15 hours at 130° C., for 6 hours at 160° C., for 16 hours at 180° C., for 4 hours at 200° C., and for 4 hours at 225° C.

The thermoset polymer formed after heating to 225° C. was tougher than that from example 8. This hard, solid polymer maintains a high modulus up to 200° C. and exhibits elastomeric behavior when heated to 235° C.

EXAMPLE 10

This example shows preparation of a thermoset polymer by reacting dicyclopentadiene and methylhydrocyclosiloxanes in the same manner as in example 9, except that the monomers were used in amounts such that the ratio of carbon-carbon double bonds to hydrosilane groups of 1.15:1 and the final heating was for 4 hours at 150° C., for 2 hours at 235° C., and for 4 hours at 285° C.

EXAMPLE 11

This example shows preparation of a thermoset polymer by reacting dicyclopentadiene and methylhydrocyclosiloxanes in the same manner as in example 10, except that the monomers were used in amounts such that the ratio of carbon-carbon double bonds to hydrosilane groups of 1.30:1.

All the polymers produced in examples 9 to 11 exhibited thermoset characteristics and did not melt or lose their shape at temperatures below the decomposition points of the polymers (400° to 500° C.). Polymers prepared from reactants having a carbon-carbon double bond:hydrosilane equivalents ratio near 1:1 were post-cured at 285° to 300° C. to increase their glass transition temperature to the 260° to 300° C. range. The cross-link density of such polymers was high enough to prevent segmental motion and network deformation.

EXAMPLE 12

This example shows preparation of a thermoset polymer by reacting dicyclopentadiene and methylhydrocyclosiloxanes in the same manner as in example 8, except that the monomers were used in amounts such that the ratio of carbon-carbon double bonds to hydrosilane groups was 1.46:1 and the final heating was for 6 hours at 150° C., for 6 hours at 200° C., for 2 hours at 235° C., and for 4 hours at 285° C.

This example demonstrates polymerization in the transition range from thermoset behavior to thermoplastic behavior. When polymerized up to 200° C., the sample softened to a highly compressible elastomer at about 120° to 125° C. When the sample was post-cured at 285° C., the glass transition temperature was raised to only 200° C. The degree of cross-linking was limited by available hydrosilane groups.

EXAMPLE 13

This example shows preparation of a thermoplastic polymer by reacting dicyclopentadiene and methylhydrocyclosiloxanes in the same manner as in example 9, except in amounts such that the ratio of carbon-carbon double bonds to hydrosilane groups was 1.61:1 and the final heating was for 6 hours at 150° C., for 6 hours at 200° C., for 8 hours at 235° C., and for 4 hours at 285° C.

EXAMPLE 14

This example shows preparation of a thermoplastic polymer by reacting dicyclopentadiene and methylhydrocyclosiloxanes in amounts such that the ratio of carbon-carbon double bonds to hydrosilane groups was 1.75:1.

A catalyst solution containing 600 ppm chloroplatinic acid was prepared by heating 0.0953 g of chloroplatinic acid with 158.8 g dicyclopentadiene to 70° C. for 1.5 hours in a sealed 8 ounce reaction vessel, under nitrogen. A 150 ppm chloroplatinic acid solution was prepared by diluting 30 g of the above catalyst solution with 90 g of dicyclopentadiene. A portion of the resultant chloroplatinic acid solution (7.92 g) was weighed into a 7 inch reaction vessel with 4.59 g of dicyclopentadiene, making a 95 ppm concentration of chloroplatinic acid in dicyclopentadiene (0.185 gram equivalent of olefin). Then, 7.21 g (0.106 hydrosilane equivalents) of methylsiloxanes (described in example 10) were injected into the sealed reaction vessel at 23° C. The reaction mixture was heated to 36° C. and a slight exotherm raised the temperature to 60° C., where the mixture became viscous. A vacuum (15 mm Hg) was applied to the contents of the reaction vessel at 45° C. for 10 minutes to pull gas out of the reaction product. The product was poured into a teflon coated stainless steel mold and heated in a nitrogen blanket for 6 hours at 150° C., for 20 hours at 200° C., and for 6 hours at 225° to 235° C. The 3"×⅛"×⅛" specimens removed from the mold were transparent, hard solid with a melting point of 117° to 125° C. This solid could be ground into a crystalline powder.

The polymers of examples 13 and 14 do not form a complete polymeric network, even when they are polymerized at 225° to 235° C. They are completely thermoplastic and form a viscous, flowable liquid above their melting points. The solids can be ground into powder.

The properties of the polymers prepared in examples 8 to 14 are shown in the following Table.

these embodiments are not intended to be limiting and that many variations and modifications are possible without departing from the scope of this invention.

What is claimed is:

1. A process for preparing an organosilicon prepolymer comprising partially reacting, in the presence of a hydrosilation catalyst, (a) a cyclic polysiloxane or tetrahedral siloxysilane containing at least two ≡SiH groups and (b) a polycyclic hydrocarbon polyene having in its rings at least two chemically distinguishable carbon-carbon double bonds, wherein 30% to 65% of the ≡SiH groups are reacted, the ratio of carbon-carbon double bonds in the rings of (b) to ≡SiH groups in (a) is greater than 0.5:1 and up to 1.8:1, and at least one of the compounds (a) and (b) has more than two reactive sites.

2. The process of forming an organosilicon prepolymer as claimed in claim 1, wherein the silicon-containing reactant (a) is:

(I)

| | Organosilicon Polymers (Examples 11 to 17) Dicyclopentadiene/Methylhydrocyclosiloxane | | | | | | |
|---|---|---|---|---|---|---|---|
| | Example No. | | | | | | |
| | 8 | 9 | 10 | 11 | 12 | 13 | 14 |
| \C=C/ ≡Si—H Equiv. Ratio | 0.70 | 0.85 | 1.15 | 1.30 | 1.46 | 1.61 | 1.75 |
| Chloroplatinic Acid Catalyst (ppm)* | 175 | 174 | 178 | 177 | 179 | 181 | 95 |
| Max. Polymerization Temp. (°C.) | 225 (285) | 225 | 150 | 150 (285) | 200 (285) | 235 | 225 |
| Melting/Softening Point Glass Transition Temp. (°C.) | SP 100 | 300 | 300 | 300 | SP 120-125 | MP 120-125 | MP 117-125 |
| Mechanical Thermal DSC** | 100 | 235 | 155 | 135 (210) 108 | 120 (200) 88 | — — | — — |
| Initial Weight Loss TGA, °C., (% residue, 1000° C.) | | | | | | | |
| N₂ | — | — | — | 460 (43.5) | 460 (45.9) | 450 (44.1) | 500 (47.0) |
| Air | — | — | — | 470 (35.6) | 470 (33.7) | 450 (34.0) | 500 (33.4) |

*Calculated by dividing the total weight of the dry chloroplatinic acid by the total weight of all the reactants.
**Differential Scanning Calorimeter.

EXAMPLE 15

This example shows preparation of a graphite fiber composite.

Chloroplatinic acid (0.0185 g) was weighed into a reaction vessel in a dry box and the reaction vessel was sealed. Dicyclopentadiene (47.15 g, 0.357 mole, 0.714 equivalents) was injected into the reaction vessel and the mixture was heated with stirring to 60° C. for 1 hour. After cooling to 36° C., tetramethylcyclotetrasiloxane (44.67 g) was injected. In two minutes, the sample exothermed to 192° C. The product was cooled and injected into a teflon lined mold 5"×5"×⅛" containing ten 5"×5" sheets of square woven graphite fiber cloth. The loaded mold was heated in a nitrogen blanketed oven for 15 hours at 130° C., for 6 hours at 160° C., and for 12 hours at 180° C. The resulting composite had good flexural strength (68,000 psi) and modulus (4.7×10⁶ psi).

While this invention has been described with respect to specific embodiments, it should be understood that wherein R, which can be the same or different, is hydrogen or a substituted or unsubstituted alkyl, alkoxy, aromatic or aryloxy radical, n is an integer from 3 to about 20, and R is hydrogen on at least two of the silicon atoms in the molecule; or is:

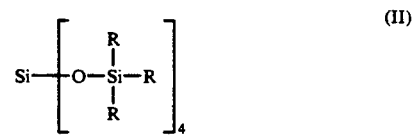
(II)

wherein R is as defined above and is hydrogen on at least two silicon atoms in the molecule, and the polycyclic polyene is selected from the group consisting of dicyclopentadiene, tricyclopentadiene and methyl dicyclopentadiene.

3. The process of forming an organosilicon prepolymer as claimed in claim 1, wherein the hydrosilation catalyst is a platinum-containing catalyst and the ratio of carbon-carbon double bonds in the rings of (b) to ≡SiH groups in (a) is in the range of about 0.7:1 up to about 1.3:1.

4. The process of forming an organosilicon prepolymer as claimed in claim 2, wherein the hydrosilation catalyst is chloroplatinic acid and the ratio of carbon-carbon double bonds in the rings of (b) to ≡SiH groups in (a) is in the range of from about 0.8:1 up to about 1.1:1.

5. The process of claim 1 wherein the reaction is discontinued at the point where 30 to 65% of the ≡SiH groups have reacted.

6. The process of forming a crosslinked organosilicon polymer consisting essentially of (a) preparing an organosilicon prepolymer according to the process of claim 1 and (b) curing, in the presence of a hydrosilation catalyst, the organosilicon prepolymer so as to form a crosslinked organosilicon polymer.

7. The process of forming a crosslinked organosilicon polymer consisting essentially of providing an organosilicon prepolymer, wherein the organosilicon prepolymer is the partial reaction product of (a) a cyclic polysiloxane or a tetrahedral siloxysilane containing at least two ≡SiH groups and (b) a polycyclic hydrocarbon polyene having in its rings at least two chemically distinguishable carbon-carbon double bonds, the ratio of carbon-carbon double bonds in the rings of (b) to ≡SiH groups in (a) is greater than 0.5:1 and up to 1.8:1, at least one of the compounds (a) and (b) has more than two reactive sites, and 30 to 65% of the ≡SiH groups are reacted and curing the organosilicon prepolymer in the presence of a hydrosilation catalyst to form a crosslinked organosilicon polymer.

8. The process of forming a crosslinked organosilicon polymer as claimed in claim 7, wherein the silicon-containing reactant (a) is:

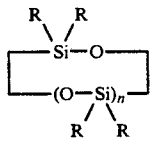

(I)

wherein R, which can be the same or different, is hydrogen or a substituted or unsubstituted alkyl, alkoxy, aromatic or aryloxy radical, n is an integer from 3 to about 20, and R is hydrogen on at least two of the silicon atoms in the molecule; or is:

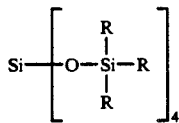

(II)

wherein R is as defined above and is hydrogen on at least two silicon atoms in the molecule.

9. The process of forming a crosslinked organosilicon polymer as claimed in claim 8, wherein the polycyclic polyene is selected from the group consisting of dicyclopentadiene, tricyclopentadiene and methyl dicyclopentadiene.

10. The process of forming a crosslinked organosilicon polymer as claimed in claim 7, wherein the hydrosilation catalyst is a platinum-containing catalyst and the ratio of carbon-carbon double bonds in the rings of (b) to ≡SiH groups in (a) is in the range of about 0.7:1 up to about 1.3:1.

11. The process of forming a crosslinked organosilicon polymer as claimed in claim 9, wherein the hydrosilation catalyst is chloroplatinic acid and the ratio of carbon-carbon double bonds in the rings of (b) to ≡SiH groups in (a) is in the range of from about 0.8:1 up to about 1.1:1.

12. The process of forming a fiber reinforced composite material comprising: (i) impregnating with an organosilicon prepolymer up to 80%, by weight of the resultant fiber reinforced composite material, fibrous reinforcement selected from the group consisting of glass, carbon, metallic, ceramic or synthetic polymer fibers, or fiber mat; and (ii) curing, in the presence of a hydrosilation catalyst, the prepolymer to form a fiber reinforced composite material, wherein the organosilicon prepolymer is the partial reaction product of (a) a cyclic polysiloxane or a tetrahedral siloxysilane containing at least two ≡SiH groups and (b) a polycyclic hydrocarbon polyene having in its rings at least two chemically distinguishable carbon-carbon double bonds, wherein the ratio of carbon-carbon double bonds in the rings of (b) to ≡SiH groups in (a) is greater than 0.5:1 and up to 1.8:1, at least one of the compounds (a) and (b) has more than two reactive sites and wherein 30% to 65% of the ≡SiH groups are reacted.

13. The process of forming a fiber reinforced composite material as claimed in claim 12, wherein the silicon-containing reactant (a) is:

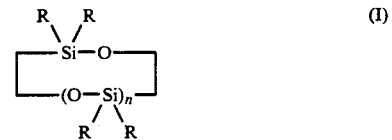

(I)

wherein R, which can be the same or different, is hydrogen or a substituted or unsubstituted alkyl, alkoxy, aromatic or aryloxy radical, n is an integer from 3 to about 20, and R is hydrogen on at least two of the silicon atoms in the molecule; or is:

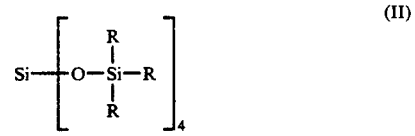

(II)

wherein R is as defined above and is hydrogen on at least two silicon atoms in the molecule.

14. The process of forming a fiber reinforced composite material as claimed in claim 13, wherein the polycyclic polyene is selected from the group consisting of dicyclopentadiene, tricyclopentadiene and methyl dicyclopentadiene.

15. The process of forming a fiber reinforced composite material as claimed in claim 12, wherein the hydrosilation catalyst is a platinum-containing catalyst and the ratio of carbon-carbon double bonds in the rings of (b) to ≡SiH groups in (a) is in the range of about 0.7:1 up to about 1.3:1.

16. The process of forming a fiber reinforced composite material as claimed in claim 14, wherein the hydrosilation catalyst is chloroplatinic acid and the ratio of carbon-carbon double bonds in the rings of (b) to ≡SiH groups in (a) is in the range of from about 0.8:1 up to about 1.1:1.

17. The process of forming a fiber reinforced composite material as claimed in claim 12, wherein step (i) comprises charging a mold containing the fiber reinforcement with the organosilicon prepolymer.

18. The process of forming a fiber reinforced composite material as claimed in claim 12, wherein step (i) comprises injecting the organosilicon prepolymer into a mold containing the fiber reinforcement.

19. The process of forming a fiber reinforced composite material comprising:
  (i) forming a prepolymer by partially reacting, in the presence of a hydrosilation catalyst, (a) a cyclic polysiloxane or tetrahedral siloxysilane containing at least two ≡SiH groups and (b) a polycyclic hydrocarbon polyene having in its rings at least two chemically distinguishable carbon-carbon double bonds, to the extent that 30% to 65% of the ≡SiH groups are reacted, wherein the ratio of carbon-carbon double bonds in the rings of (b) to ≡SiH groups in (a) is greater than 0.5:1 and up to 1.8:1, and at least one of the compounds (a) and (b) has more than two reactive sites;
  (ii) impregnating with the organosilicon prepolymer up to 80%, by weight of the resultant fiber reinforced composite material, fibrous reinforcement selected from the group consisting of glass, carbon, metallic, ceramic or synthetic polymer fibers, or fiber mat; and
  (iii) curing, in the presence of a hydrosilation catalyst, the prepolymer to form a fiber reinforced composite material.

20. The process of forming a fiber reinforced composite material as claimed in claim 12, wherein the silicon-containing reactant (a) is:

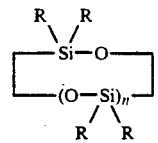

(I)

wherein R, which can be the same or different, is hydrogen or a substituted or unsubstituted alkyl, alkoxy, aromatic or aryloxy radical, n is an integer from 3 to about 20, and R is hydrogen on at least two of the silicon atoms in the molecule; or is:

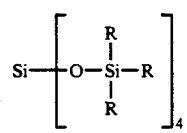

(II)

wherein R is as defined above and is hydrogen on at least two silicon atoms in the molecule; the polycyclic polyene is selected from the group consisting of dicyclopentadiene, tricyclopentadiene and methyl dicyclopentadiene; the hydrosilation catalyst is a platinum-containing catalyst; and the ratio of carbon-carbon double bonds in the rings of (b) to ≡SiH groups in (a) is in the range of about 0.7:1 up to about 1.3:1.

21. The process of forming a fiber reinforced composite material as claimed in claim 20, wherein the hydrosilation catalyst is chloroplatinic acid and the ratio of carbon-carbon double bonds in the rings of (b) to ≡SiH groups in (a) is in the range of from about 0.8:1 up to about 1.1:1.

* * * * *